(12) United States Patent
Wang et al.

(10) Patent No.: US 10,334,669 B2
(45) Date of Patent: Jun. 25, 2019

(54) LED ARRANGEMENT AND LED DRIVING METHOD

(71) Applicant: SIGNIFY HOLDING B.V., Eindhoven (NL)

(72) Inventors: Shan Wang, Shanghai (CN); Chun Yang, Shanghai (CN); Zhi Quan Chen, Shanghai (CN); Gang Wang, Shanghai (CN); Jie Fu, Shanghai (CN)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 15/922,039

(22) Filed: Mar. 15, 2018

(65) Prior Publication Data

US 2018/0352621 A1    Dec. 6, 2018

(30) Foreign Application Priority Data

May 15, 2017  (WO) ................. PCT/CN2017/076827
May 22, 2017  (EP) ..................................... 17172295

(51) Int. Cl.
| | |
|---|---|
| *H05B 33/08* | (2006.01) |
| *H05B 37/02* | (2006.01) |
| *H05B 39/04* | (2006.01) |
| *G05F 1/10* | (2006.01) |
| *F21Y 115/10* | (2016.01) |

(52) U.S. Cl.
CPC ........... *H05B 33/0815* (2013.01); *G05F 1/10* (2013.01); *H05B 33/083* (2013.01); *H05B 33/0812* (2013.01); *H05B 33/0848* (2013.01); *H05B 39/044* (2013.01); *F21Y 2115/10* (2016.08); *Y02B 20/343* (2013.01)

(58) Field of Classification Search
CPC ................ H05B 33/08; H05B 33/0815; H05B 33/0821; H05B 33/0842; H05B 33/0845; H05B 33/0848; H05B 37/02; H05B 37/0281; H05B 33/0812; H05B 33/083; H05B 39/04; H05B 39/044; H05B 39/06
See application file for complete search history.

(56) References Cited

U.S. PATENT DOCUMENTS

| | | | | | |
|---|---|---|---|---|---|
| 8,749,172 | B2 * | 6/2014 | Knapp | ............... | H05B 33/0869 |
| | | | | | 315/185 R |
| 8,890,424 | B2 * | 11/2014 | Xu | ..................... | H05B 33/0815 |
| | | | | | 315/192 |
| 2005/0127381 | A1 * | 6/2005 | Vitta | ........................ | F21K 9/00 |
| | | | | | 257/88 |
| 2006/0049782 | A1 * | 3/2006 | Vornsand | ........... | H05B 33/0869 |
| | | | | | 315/312 |
| 2008/0309255 | A1 * | 12/2008 | Myers | ...................... | F21K 9/00 |
| | | | | | 315/297 |
| 2012/0262075 | A1 | 10/2012 | Lynch et al. | | |

(Continued)

*Primary Examiner* — Thai Pham
(74) *Attorney, Agent, or Firm* — Akarsh P. Belagodu

(57) ABSTRACT

A lighting circuit uses a tapped linear driver architecture in which there are at least two LED types; a first LED type with a first forward voltage, and a second LED type with a second forward voltage at least double the first forward voltage. The first segment of the tapped linear driver comprises more LEDs of the first type than the second type and the last segment comprises more LEDs of the second type than the first type. This arrangement enables a reduction in the number of LEDs needed, but without significantly impacting on the efficiency of the circuit.

15 Claims, 4 Drawing Sheets

(56) References Cited

U.S. PATENT DOCUMENTS

2013/0234609 A1* 9/2013 Akiyama ............ H05B 33/083
           315/185 R
2014/0125229 A1  5/2014 Ni
2016/0255687 A1* 9/2016 Zhang ................ H05B 33/0818
           315/210

* cited by examiner

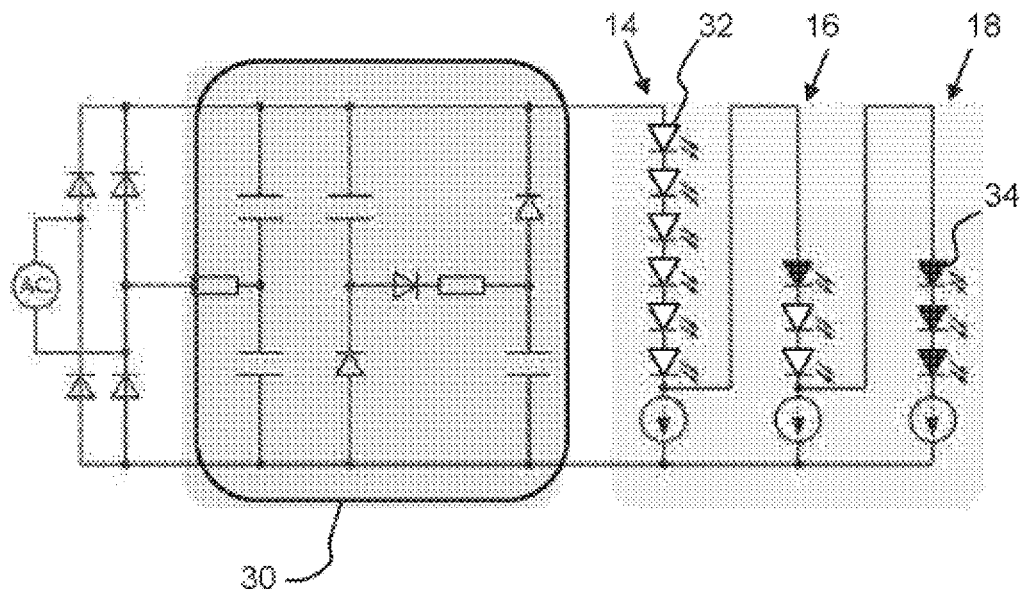
FIG. 3
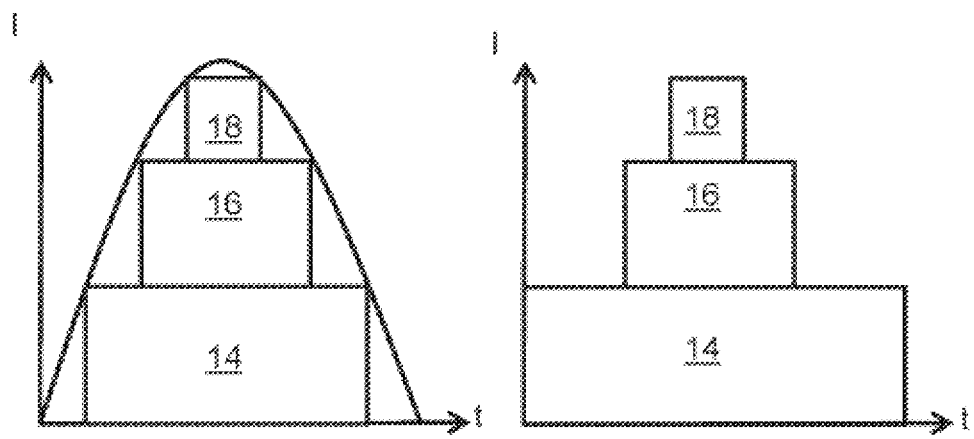
FIG. 4A
FIG. 4B

LED ARRANGEMENT AND LED DRIVING METHOD

FIELD OF THE INVENTION

This invention relates to an LED arrangement and LED driving method, in particular which makes use of a tapped linear driver architecture.

BACKGROUND OF THE INVENTION

The available space for an LED driver has limited many retrofit applications for LED lamps, such as a tubular LED lamp. The traditional LED architecture and driver topology for tubular LEDs requires a driver space much larger than the space that the existing tube dimensions (e.g. a T5 tube) can offer.

A tapped linear driver design is therefore considered as a good alternative solution for applications with space constraints, since it requires much smaller power components and enables the driver size to be minimized. A basic principle of tapped linear driver is that switching LEDs with a flexible number whose forward voltage matches the input voltage in relatively real time.

Tapped linear drivers suffer from some power loss, in particular when the input voltage (e.g. from the mains) exceeds the string voltage of the LEDs being driven. This causes a decrease of the driver efficiency, and thus influences the system efficiency. In order to have higher driver efficiency and less electrical loss, the maximum achievable LED voltage should be as close as possible to the peak of input voltage.

For example, for a 220V input voltage, if a normal white LED with a forward voltage (Vf) of 3.1V is selected, then to providing voltage matching, around 70 LEDs are needed (regardless of the luminous output requirement of the system). In order to improve the power factor, the LED current limit when the input voltage is around its peak value is set larger than the LED current when input voltage is low. The current flowing to the LED strings thus forms a step-wise shape: when one LED string is turned on or off, the LED current immediately rises or falls to reach the new current limit setting. This gives rise to a modulated light output, which gives rise to flicker.

The tapped linear driver generally requires one or more energy storage units to reduce light flicker and a stroboscopic effect due to the zero crossing of the mains input. A valley fill circuit is for example used for this purpose.

The tapped linear driver has the advantages of a very simple circuit, a low cost driver, and low volume solution. However, the driver requires a very high LED count for lighting applications. For example, if the tapped linear driver is for a 220V (RMS) AC supply and using normal 3.1V LEDs, as many as 81 LEDs may be needed which is quite costly.

SUMMARY OF THE INVENTION

A basic idea of the embodiments of the invention is that by using multiple LED types within a tapped linear driver architecture, some with higher forward voltage than others, the LED count can be reduced but the forward voltage of LEDs can still match the peak voltage of the input power without significant impact on the overall system efficiency.

The invention is defined by the claims.

According to examples in accordance with an aspect of the invention, there is provided a lighting circuit comprising:

an input adapted to receive a time-variable input voltage;
a plurality of LED segments comprising at least a first LED segment and a last LED segment;
a switch network coupled to the plurality of LED segments, adapted to switch a time-variable set of LED segments in a series connection to the input with a total forward voltage of the set of LED segments selected in dependence on the amplitude of the time-variable input voltage,
wherein the switch network is adapted to:
    switch only a first segment when the amplitude of the time-variable input voltage is below a first threshold; and
    switch the first segment and the last segment in series when the amplitude of the input voltage is above a last threshold,
wherein there are at least two LED types; a first LED type with a first forward voltage, and a second LED type with a second forward voltage at least double the first forward voltage, and wherein the first segment comprises more LEDs of the first type than the second type and the last segment comprises more LEDs of the second type than the first type.

The switch network and the LED segments together define a tapped linear drive architecture. In this architecture, by combining segments of LEDs, the total forward voltage can be matched to the instantaneous level of the input voltage. The invention is based on providing at least two different LED types with different forward voltages. The second LED type, with larger forward voltage, helps to match the input voltage since each unit of the second LED type adds a larger forward voltage. They have at least double the forward voltage, for example at least 3 times, or at least 4 times or even at least 5 times. This addresses the problem that tapped linear driver architectures generally require a large number of LEDs in order to enable the forward voltage characteristics to be matched to the time-variable input voltage. The LEDs with the first forward voltage have generally more output lumen than the LEDs with the second forward voltage, and they are turned on for a longer duration than the LEDs with the second forward voltage, thus the total output of the lighting circuit is more smooth with less flicker.

The LEDs in the first segment are on for the greatest portion of the time, so that the more efficient low voltage LEDs of the first type are predominantly used. The LEDs in the last segment are on for the least time, so lower efficiency LEDs can be used. The advantage is that this enables a lower total number of LEDs since fewer LEDs are required with the larger forward voltage.

By "switch only a first segment" is intended to include that the first segment is always on when the amplitude of the time-variable input voltage is below a first threshold, or else there may a time when the first LED segment is off (for example if the input is below another, lower, threshold).

Preferably, the first segment may comprise only LEDs of the first LED type. The first type of LED is for example more power efficient, so by using this type in the first segment, which is used for the greatest fraction of the time, the overall efficiency is kept high.

The last segment may comprise only LEDs of the second LED type. This reduces the overall number of LEDs needed.

The time-variable input for example comprises a mains input with sinusoidal waveform.

The first LED type may be a single junction LED, and the second LED type may be a multi-junction LED. The first forward voltage is for example in the range 3V to 6V and the second forward voltage is in the range 12V to 48V.

The forward voltage of the first segment may be equal to or higher than 0.5 times the peak amplitude of the input voltage, for example in the range 0.5 to 0.75 times the peak amplitude. The higher the forward voltage of the first string, the more LEDs can be used in the first string of the first LED type, giving high overall efficiency.

A capacitor circuit or a valley fill circuit may be provided between the input and the plurality of LED segments.

A high string voltage of the first LED string would normally imply a shorter on-time (since the on-time is only when the instantaneous input voltage is higher than the string voltage), which would require periods of no LED being driven. A valley fill or capacitor circuit provides voltage smoothing so that the first LED segment can remain turned on for a longer time. The greater the string voltage of the first LED segment, the greater the smoothing needed, and hence the more distortion that is introduced. Thus, there is an upper limit on the string voltage of the first segment which is below the peak input voltage.

In use, the capacitor circuit or the valley fill circuit is for example adapted to provide a voltage no less than the first threshold when the time-variable input voltage is less than the first threshold, and the first LED segment is adapted to remain permanently on throughout a whole period of the time-variable input voltage.

This means that flicker is reduced, because only the higher LED strings are turned on and off, whereas most of the light output can come from the first string which is permanently on for the whole period of input voltage.

The output lumen of the first segment may be equal to or greater than 0.5 times the total lumen of the circuit, for example equal to or greater than 0.75 times the total lumen. Thus, most of the light output is provided by the more efficient LED type, and without flicker if the first segment is able to on for a longer duration or continuously.

The forward voltage of the last segment may be at least 0.25 times the peak amplitude of the input voltage, and at most 0.5 times the peak amplitude of the input voltage. The output lumen of the last segment may be equal to or less than 0.2 times the total lumen of the circuit.

The LEDs of the first and second types may have the same output color. This means that the switching between different LED types at different timings of the input cycle is not perceived by the user. Thus, the different forward voltages do not relate to different colored LEDs in different segments.

The invention also provides a method driving a lighting circuit, comprising:
  providing a time-varying input voltage and coupling the input voltage to a set of LED segments;
  selecting which LED segments to include in a series connection such that the total forward voltage of the series connection is selected in dependence on the amplitude of the time-varying input voltage,
    wherein the switching comprises:
      switching only a first segment when the amplitude of the time-varying input voltage is below a first threshold; and
      switching the first segment and a last segment in series when the amplitude of the input voltage is above a last threshold,
    wherein there are at least two LED types; a first LED type with a first forward voltage, and a second LED type with a second forward voltage at least double the first forward voltage, and wherein the first segment comprises more LEDs of the first type than the second type and the last segment comprises more LEDs of the second type than the first type.

The method may comprise smoothing the input voltage such that the first LED segment remains permanently on in use.

These and other aspects of the invention will be apparent from and elucidated with reference to the embodiment(s) described hereinafter.

BRIEF DESCRIPTION OF THE DRAWINGS

Examples of the invention will now be described in detail with reference to the accompanying drawings, in which:
FIG. 3 shows a valley fill circuit between the input and the plurality of LED segments;
FIGS. 4A and B show the effect of the valley fill circuit on the timing of operation of the LED segments.

DETAILED DESCRIPTION OF THE EMBODIMENTS

The invention provides a lighting circuit which uses a tapped linear driver architecture in which there are at least two LED types; a first (higher efficiency) LED type with a first forward voltage, and a second (lower efficiency) LED type with a second forward voltage at least double the first forward voltage. The first segment of the tapped linear driver comprises more LEDs of the first type than the second type and the last segment comprises more LEDs of the second type than the first type. This arrangement enables a reduction in the number of LEDs needed in order to match the forward voltage of the LEDs with the peak of the input voltage, but without significantly impacting on the efficiency of the circuit.

Figure 1:
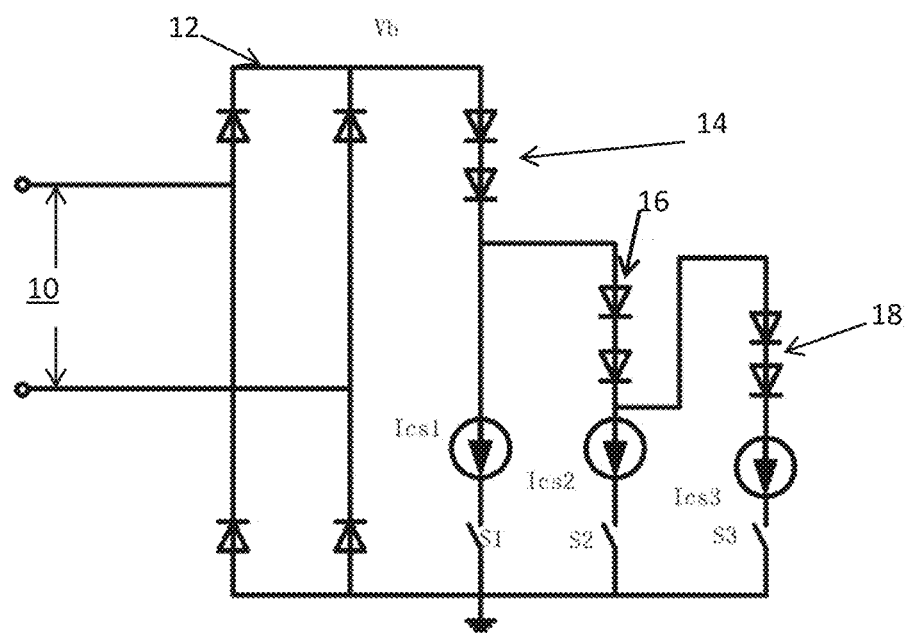
FIG. 1 shows a known tapped linear LED driver architecture.

FIG. 1 shows a known tapped linear LED driver architecture.

The circuit of FIG. 1 comprises a mains input 10 which is provided to a diode bridge rectifier 12. The rectified output Vb is provided to three segments of LEDs. Each LED segment comprises a sting (i.e. a series connection) of LEDs. However, each LED segment could include combinations of series and parallel LEDs if desired. For the purposes of explanation, it is assumed that each LED segment includes a single series string of LEDs.

A first string 14 is between the rectified output and a first current source Ics1 which sinks to ground. A second string 16 is in series with the first string 14 between the rectified output and a second current source Ics2 which sinks to ground. Thus, the first current source Ics1 connects to the junction between the first and second LED strings 14, 16. A third string 18 is in series with the first and second strings 12, 14 between the rectified output and a third current source Ics3 which sinks to ground. Thus, the second current source Ics2 connects to the junction between the second and third LED strings 16, 18.

Each current source has an associated series control switch S1, S2, S3.

The three switches S1, S2, S3 are controlled by a controller according to the mains input voltage. When the rectified mains voltage Vb is higher than a first threshold that is higher than the forward voltage of LED string 14 but lower than a second threshold that is the sum of forward voltage of LED strings 14 and 16, S1 is at the "on" state, and S2 and S3 are at the "off" state. Only LED string 14 is turned on.

When the rectified mains voltage Vb is higher than the forward voltage of LED string 16 plus LED string 14 but lower than the voltage of LED string 14 plus LED string 16 plus LED string 18, S1 and S3 are at the "off" state, and S2 is at the "on" state. LED strings 14 and 16 are turned on.

Finally, when the rectified mains voltage Vb is higher than the sum of forward voltage of all three LED strings, S3 is at the "on" state, and S1 and S2 are at the "off" state. LED strings 14, 16 and 18 are turned on.

In this case the LED packages of the overall LED device are thus separated into three groups to be driven by the linear tapped driver.

The architecture may be scaled to four or more groups, or be scaled to two groups.

It will be seen that over time, the string 14 is turned on for more time than the string 16 which is turned on for more time than the string 18.

Figure 2:
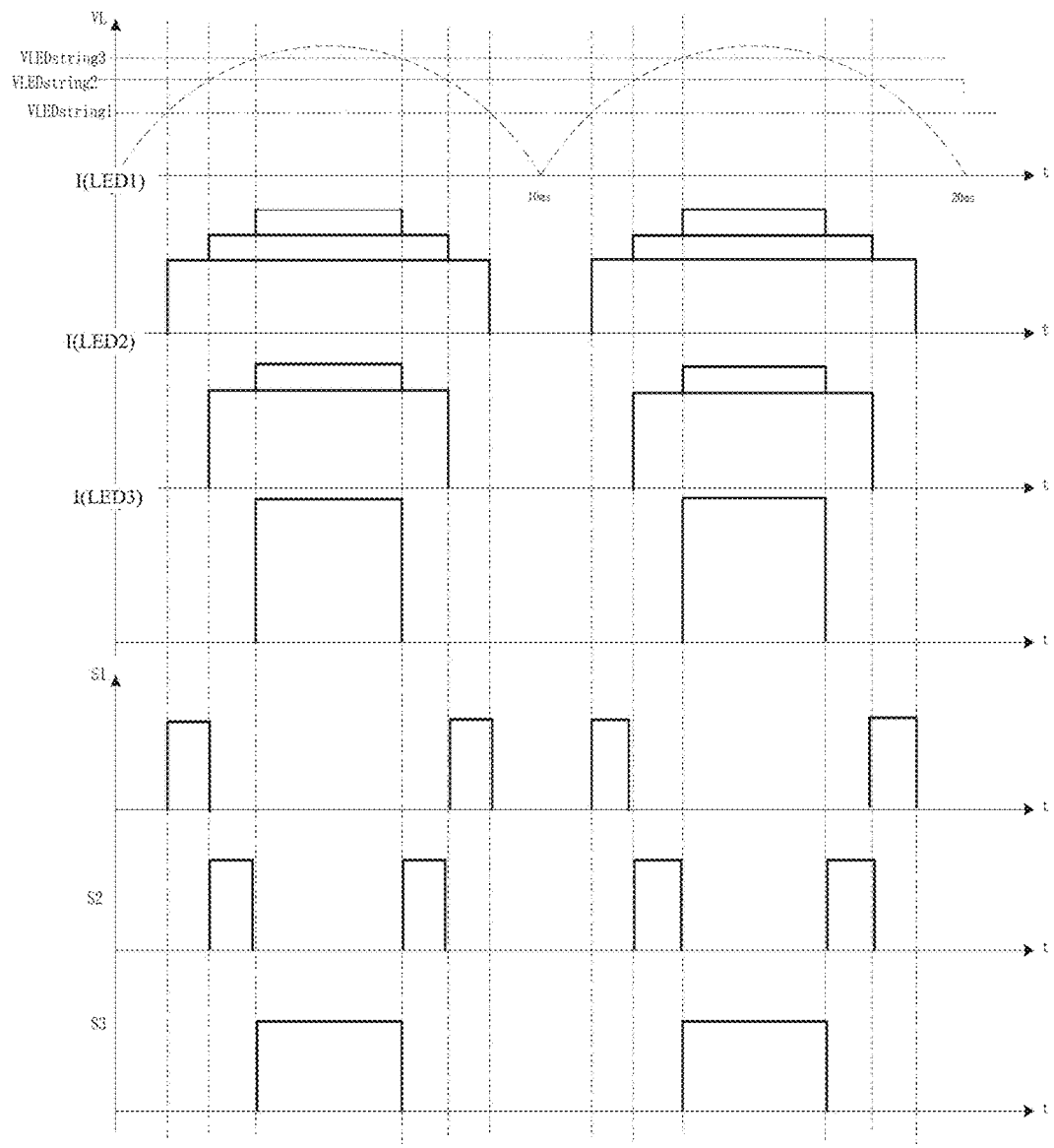
FIG. 2 shows the operation of the circuit of FIG. 1.

The operation can be seen in FIG. 2. The top plot shows the mains input voltage and the three threshold voltages used to control the switches. VLEDstring1 is the voltage needed to drive current through the string 14 alone. VLEDstring2 is the voltage needed to drive current through the series combination of strings 14 and 16. VLEDstring3 is the voltage needed to drive current through the series combination of all three strings.

The current waveform through the three strings is shown in the next three plots as I(LED1), I(LED2) and I(LED3). This assumes that Ics3>Ics2>Ics1 for ease of representation for a low total harmonic distortion, but they may be the same in a simplified implementation such as low power lamps wherein the total harmonic disorder is not a crucial problem.

The different groups of LEDs may for example be different color LEDs or all are white.

The general architecture of FIG. 1 can be used to implement the circuit of the invention, by selection of the type of LEDs to be used within the different LED strings.

There are many different types of LED. For the purposes of explanation, two different LED types are considered; low voltage LEDs and high voltage LEDs.

Table 1 below shows the characteristics for the two generic LED types (low voltage, LV, and high voltage, HV).

TABLE 1

|  | LV LED | HV LED |
|---|---|---|
| Forward voltage (V) | 3.1 | 24 |
| Nominal current (A) | 0.060 | 0.030 |
| Nominal lumen output (lm) | 25 | 25 |

As shown, the low voltage LEDs have much lower forward voltage. However, to achieve the same lumen output, a higher current is current. The first, low voltage, LED type may for example be a single junction LED, and the second, high voltage, LED type may be a multi-junction LED.

More generally, the first forward voltage is for example in the range 3V to 6V and the second forward voltage is for example in the in the range 12V to 48V, for example 24V to 48V.

If the circuit of FIG. 1 is implemented only with high voltage LEDs, they have a lower efficiency/lower output compared to a circuit implemented low voltage LEDs. A full high voltage LED solution will thus result in low system efficiency even though a reduced total number of LEDs may be used. This will also only enable a single design to be created, rather than a platform for future designs. For example, any required modification to the LED board setting (e.g. if there is a desire to reduce the number of LEDs to follow LED efficiency improvements) will cause a drastic decrease of the driver efficiency and give rise to other potential thermal issues for the driver.

If the circuit of FIG. 1 is implemented with only low voltage LEDs, then too many LEDs are needed which will give a significant LED cost. The flicker issue is also difficult to resolve.

The invention provides a hybrid approach, in which both LED types are used. This approach is able to reach a similar efficiency as a system with only low voltage LEDs but enables a significant reduction in the total LED count. Thus, the LED cost is reduced compared to a system with all low voltage LEDs. Furthermore, a reduced flicker is made possible compared to designs with only one LED type.

With reference to FIG. 1, the first LED segment 14 is used for the largest fraction of the time, namely with the highest duty cycle. For this reason, the first segment 14 comprises more LEDs of the first type than the second type. This means that the overall system efficiency is kept high, because the LEDs which contribute most to the output are the more efficient low voltage LEDs. The last segment 18 comprises more LEDs of the second type than the first type. This enables a reduction in the LED count, but without impacting too significantly on the system efficiency.

There may be only two segments. However, if there is one or more intermediate segments, they may comprise different mixtures of LED types, including all of one type or the other.

At the limit, the first segment 14 may comprise only LEDs of the first, low voltage, LED type. Similarly, the last segment 18 may comprise only LEDs of the second, high voltage, LED type. This reduces the overall number of LEDs needed.

As mentioned above, flicker is an issue with tapped linear drivers. One approach to resolve this issue is to use energy storage elements, to flatten the input waveform.

FIG. 3 shows a valley fill circuit 30 between the input and the plurality of LED segments. Other capacitor circuits may be used.

FIG. 3 also shows the two types of LED and thus shows the hybrid approach of the invention. The low voltage type 32 is shown with a white diode symbol, and the high voltage type 34 is shown with a black diode symbol. As shown, low voltage LEDs are used in the first segment 14, high voltage LEDs are used in the last segment 18, and a mixture is used in the middle segment 16. It may well be understood that: not shown in the figure, the high voltage type 34 may be a parallel connection of a plurality of diodes, such as two high voltage LEDs, in order to match the current of the low voltage LEDs and the high voltage LEDs.

FIGS. 4A and 4B show the effect of the valley fill circuit on the timing of operation of the LED segments. They show the current versus time.

FIG. 4A shows the timing corresponding to FIG. 2, and shows the on times for the three segments 14, 16, 18.

FIG. 4B shows that the first segment 14 may instead be turned on the whole time, because the valley fill circuit enables the voltage provided to the LEDs to be kept above the string voltage of the first segment 14 all the time.

Figure 5:
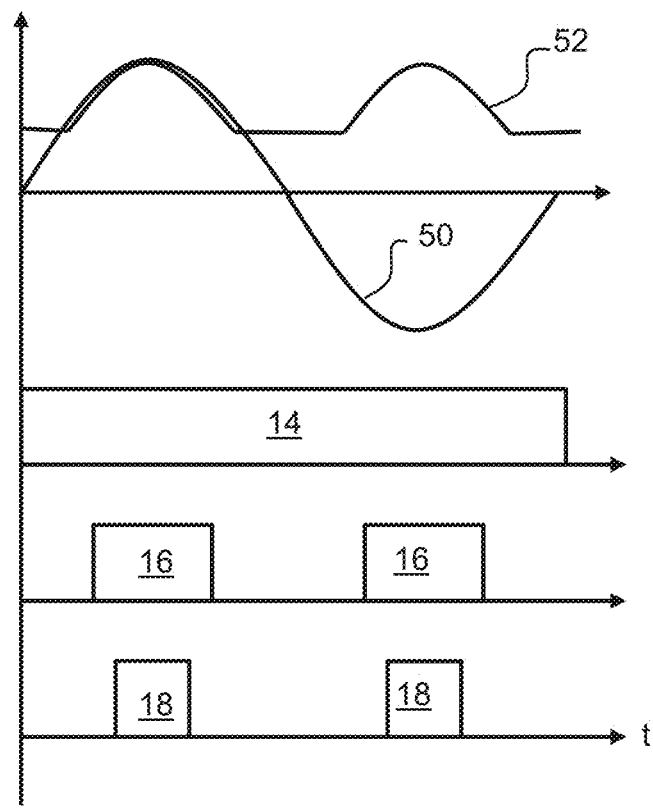
FIG. 5 shows the effect of the valley fill circuit on the voltage applied to the LED segments.

FIG. 5 shows the effect of the valley fill circuit 30 on the voltage applied to the LED segments. Plot 50 is the mains input, and plot 52 is the output of the valley fill circuit (after rectification followed by the valley fill operation). The graph also shows the timing of operation of the three LED segments 14, 16, 18 as in FIG. 4B.

By having the first string 14 permanently turned on, the flicker is reduced.

The flicker can be defined as:

$$F = (\text{Maximum current} - \text{Minimum current}) / \text{Average current}.$$

The hybrid approach also reduces flicker, even further than the simple use of a valley fill circuit.

Figure 6:
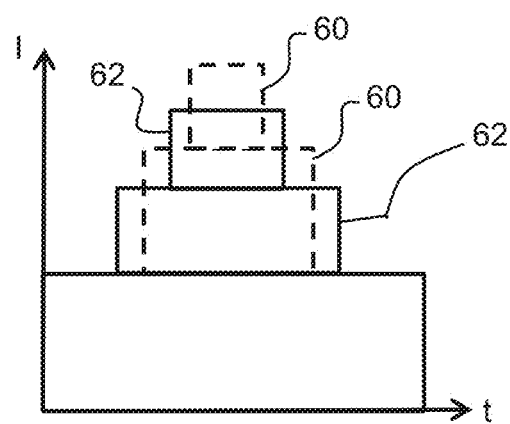
FIG. 6 shows the total LED current as a function of time for the arrangement with only low voltage LEDs and for the hybrid arrangement of the invention.

FIG. 6 shows the total LED current as a function of time for the arrangement with only low voltage LEDs and for the hybrid arrangement.

FIG. 6 shows the timing of FIG. 4B as dotted plot 60. The timing in order to reach the same lumen output with the hybrid approach is shown as solid plot 62, assuming only low voltage LEDs in the first segment 14, and only high voltage LEDs in the second and third segments 16, 18. The high voltage LEDs have lower maximum current than the low voltage LEDs so that the peak current is reduced. The minimum current remains the same, since it is the current through the first LED segment 14. The average current will drop within each cycle, but the reduction in the maximum current has more significant impact in the flicker formula above, so the amount of flicker is reduced.

The hybrid approach thus improves flicker as well as enabling a reduction in the LED count.

The forward voltage of the first segment 14 is preferably equal to or higher than 0.5 times the peak amplitude of the input voltage, for example in the range 0.5 to 0.75 times the peak amplitude. The higher the forward voltage of the first string, the more LEDs can be used in the first string of the first LED type, giving high overall efficiency. However, the higher the string voltage, the more signal reshaping is required by the valley fill (or capacitor) circuit. Thus a compromise is found between the distortion that is introduced by the valley fill circuit, and the improved efficiency by having more of the lumen output provided by the low voltage LEDs of the first string.

The output lumen of the first segment 14 may be equal to or greater than 0.5 times the total lumen of the circuit, for example equal to or greater than 0.75 times the total lumen. Thus, most of the light output is provided by the more efficient low voltage LED type. Also, if the first string is turned on the whole time, there is no contribution to flicker from this LED segment.

The forward voltage of the last segment may be at least 0.25 times the peak amplitude of the input voltage, and at most 0.5 times the peak amplitude of the input voltage. The output lumen of the last segment is for example equal to or less than 0.2 times the total lumen of the circuit. Thus, the light contribution of the last segment is kept low to avoid increases in power consumption.

An example will now be presented to demonstrate the efficiency advantages.

Assuming a system has a requirement for a lumen output of 2000 lm from a main bus voltage of 240V. A low voltage LED chip has a forward voltage of 3V, and 50 lumen output per piece, with an efficiency of 140 lm/W. A high voltage LED chip has a forward voltage of 48V, 50 lumen output per piece, and a efficiency of 110 lm/W.

If all low voltage LED chips are used, the LED count is about 70 pieces giving high cost, but the overall efficiency is 140 lm/W. If all high voltage LED chips are used, the LED count is about 40 pieces, but the system has low efficiency of 110 lm/W.

The hybrid approach in this example gives an LED count of 44 pieces with an overall efficiency of 135 lm/W. The hybrid approach is based on reaching the same total string voltage and the same average lumen output.

The calculation results show that the hybrid approach approaches the efficiency of a fully low voltage system but with significant reduction in LED count and hence cost.

The LEDs of the first and second types may have the same output color. This means that the switching between different LED types at different timings of the input cycle is not perceived by the user. The reduction in flicker also means that the color tolerance may be more relaxed. For example the color constraints may be relaxed from the standard of +/−5 SDCM (standard deviations of color matching) to +/−10 SDCM.

The invention has described with reference to two LED types. However, the design may include a third or further LED types. The first string may comprise at least 75% or at least 90% (by number) of LEDs of the first type, or indeed all LEDs of the first type. The last string may comprise at least 75% or at least 90% (by number) of LEDs of the second type, or indeed all LEDs of the second type. A hybrid combination of LED types may be used for example to reach a desired total string voltage, and to provide the desired compromise between efficiency and cost.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A lighting circuit comprising:
   an input adapted to receive a time-variable input voltage;
   a first plurality of LEDs having a first forward voltage;
   a second plurality of LEDs having a second forward voltage, the second forward voltage being at least double the first forward voltage;
   a plurality of LED segments comprising at least a first LED segment and a last LED segment, wherein the first LED segment comprises more LEDs of the first plurality of LEDs than the second plurality of LEDs, wherein the last LED segment comprises more LEDs of the second plurality of LEDs than the first plurality of LEDs;
   a switch network coupled to the plurality of LED segments,
   wherein the switch network, including a plurality of switches elements respectively coupled to the plurality of LED segments, is adapted to:
      switch only the first LED segment when an amplitude of the time-variable input voltage is below a first threshold, and
      switch the first LED segment and the last LED segment in series when the amplitude of the time-variable input voltage is above a last threshold, such that a total forward voltage of the plurality of LED segments is selected in dependence on the amplitude of the time-variable input voltage.

2. The circuit as claimed in claim 1, wherein the first LED segment comprises only LEDs of the first plurality of LEDs.

3. The circuit as claimed in claim 1, and the last LED segment comprises only LEDs of the second plurality of LEDs.

4. The circuit as claimed in claim 1, wherein the time-variable input voltage comprises a mains input.

5. The circuit as claimed in claim 1, wherein the first plurality of LEDs comprises a single junction LED, and the second plurality of LEDs comprises a multi junction LED.

6. The circuit as claimed in claim 1, wherein the first forward voltage is in a range of 3V to 6V and the second forward voltage is in the range 12V to 48V.

7. The circuit as claimed in claim 1, wherein the forward voltage of the first LED segment is equal to or higher than 0.5 times a peak amplitude of the input voltage.

8. The circuit as claimed in claim 7, comprising a capacitor circuit or a valley fill circuit between the input and the plurality of LED segments.

9. The circuit as claimed in claim 8, wherein, in use, the capacitor circuit or the valley fill circuit is adapted to provide a voltage no less than the first threshold when the time-variable input voltage is less than the first threshold, and the first LED segment is adapted to remain permanently on throughout a whole period of the time-variable input voltage.

10. The circuit as claimed in claim 1, wherein an output lumen of the first LED segment is equal to or greater than 0.5 times a total lumen of the circuit.

11. The circuit as claimed in claim 1, wherein the forward voltage of the last LED segment is at least 0.25 times a peak amplitude of the input voltage, and at most 0.5 times the peak amplitude of the input voltage.

12. The circuit as claimed in claim 1, wherein an output lumen of the last LED segment is equal to or less than 0.2 times the total lumen of the circuit.

13. The circuit as claimed in claim 1, wherein LEDs of the first plurality of LEDs and the second plurality of LEDs have the same output color.

14. A method driving a lighting circuit, comprising:
providing a time-varying input voltage and coupling the time-varying input voltage to a set of LED segments, wherein the set of LED segments includes a first plurality of LEDs having a first forward voltage, and a second plurality of LEDs having a second forward voltage, wherein the set of LED segments includes a first LED segment and a last LED segment, the first LED segment comprising more LEDs of the first plurality of LEDs than the second plurality of LEDs, the last LED segment comprising more LEDs of the second plurality of LEDs than the first plurality of LEDs;
switching only the first LED segment when an amplitude of the time-varying input voltage is below a first threshold; and
switching the first LED segment and the last LED segment in series when the amplitude of the time-varying input voltage is above a last threshold, such that the total forward voltage of the set of LED segments is selected in dependence on the amplitude of the time-varying input voltage.

15. The method as claimed in claim 14, further comprising the step of smoothing the time-varying input voltage such that the first LED segment remains permanently on in use.

* * * * *